(12) United States Patent
Stegemoeller (10) Patent No.: US 10,494,187 B2
(45) Date of Patent: Dec. 3, 2019

(54) RECIRCULATING PROPPANT CONVEYOR SYSTEM

(71) Applicant: Halliburton Energy Services, Inc., Houston, TX (US)

(72) Inventor: Calvin L. Stegemoeller, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 294 days.

(21) Appl. No.: 15/532,394

(22) PCT Filed: Feb. 6, 2015

(86) PCT No.: PCT/US2015/014863
§ 371 (c)(1),
(2) Date: Jun. 1, 2017

(87) PCT Pub. No.: WO2016/126266
PCT Pub. Date: Aug. 11, 2016

(65) Prior Publication Data
US 2018/0327189 A1 Nov. 15, 2018

(51) Int. Cl.
*B65G 33/18* (2006.01)
*E21B 43/267* (2006.01)
*E21B 21/06* (2006.01)
*B65G 33/14* (2006.01)

(52) U.S. Cl.
CPC ............. *B65G 33/18* (2013.01); *B65G 33/14* (2013.01); *E21B 21/062* (2013.01); *E21B 43/267* (2013.01)

(58) Field of Classification Search
CPC ....... B65G 33/14; B65G 33/18; E21B 21/062; E21B 43/267
See application file for complete search history.

(56) References Cited

U.S. PATENT DOCUMENTS

| | | |
|---|---|---|
| 4,701,095 A | 10/1987 | Berryman et al. |
| 5,560,495 A | 10/1996 | Brenner |
| 5,911,305 A | 6/1999 | Layne |
| 8,585,341 B1 | 11/2013 | Oren et al. |
| 2008/0257449 A1 | 10/2008 | Weinstein et al. |

FOREIGN PATENT DOCUMENTS

| | | | |
|---|---|---|---|
| JP | 60217892 A | | 10/1985 |
| JP | 02269299 A | | 11/1990 |
| JP | 2001063817 A | | 3/2001 |
| JP | 2007210730 A | * | 8/2007 |
| JP | 2007210730 A | | 8/2007 |

OTHER PUBLICATIONS

International Search Report and Written Opinion issued in corresponding PCT Application No. PCT/US2015/014863 dated Oct. 21, 2015.

* cited by examiner

*Primary Examiner* — James G Sayre
(74) *Attorney, Agent, or Firm* — McAfee & Taft (57) ABSTRACT

This present application relates generally to conveyor system apparatuses and methods. The conveyor system disclosed herein provides a supply conveyor and a return conveyor in material flow communication. The supply conveyor transfers and releases a portion of material to a second source. The return conveyor re-circulates to the supply conveyor any portion of material unreleased such that the supply conveyor may re-transfer and release the unreleased portion of material to the second source.

18 Claims, 8 Drawing Sheets

RECIRCULATING PROPPANT CONVEYOR SYSTEM

FIELD OF INVENTION

This present application relates generally to handing material and conveying material to different sites and more specifically to material handling during fracturing operations.

BACKGROUND

Hydraulic fracturing is a stimulation treatment routinely performed on oil and/or gas wells. "Fracturing" refers to the method of pumping a fluid into a well until the pressure increases to a sufficient level to fracture the subterranean geological formations. A propping agent or "proppant" is injected, along with a hydraulic fluid, into the wellbore to maintain open the newly formed fractures extending from the wellbore in generally opposing directions. The proppant remains in place once the hydraulic pressure is removed and therefore props open the fracture to enhance flow in the wellbore.

Proppants can be made of virtually any generally solid particle that has sufficient particle strength, sphericity and size. Silica-containing material, like sand, and ceramic materials have proved to be especially suitable for use in hydraulic fracturing.

Typically, in any hydraulic fracturing system, a large amount of such proppant is required. Increasing technology and improved techniques have resulted in the use of greater volumes and higher concentrations of proppant in hydraulic fracturing systems in the oil field. This increased use of proppant has created the demand for more dependable proppant handling equipment capable of moving large amounts of proppant from on-location storage units to a blending apparatus with little or no spillage. The equipment must also provide a steady, even flow of proppant to the blender to prevent fluctuations in the concentration rates pumped down into the wellbore.

It can be difficult to effectively transport proppant, or some other material, to a desired location at a steady flow rate with little or no spillage. Typically, transportation of the proppant occurs by a conveyor at some predetermined volumetric flow rate. The volumetric flow rate transferring the proppant must be tightly coordinated with the volumetric flow rate of the proppant exiting the conveyor. If the proppant exits the conveyor at a volumetric flow rate less than the rate at which it is being transferred, proppant buildup occurs. Monitoring the proppant buildup to prevent spillage typically requires either human interaction or a complex electronic or hydraulic system comprising sensors and control components.

BRIEF DESCRIPTION OF THE FIGURES

FIG. 6 is a schematic illustration depicting an orientation of a conveyor system from a side view, including an orientation of a supply conveyor in relation to a return conveyor.

DETAILED DESCRIPTION

Referring now to the drawings, wherein like reference numbers are used herein to designate like elements throughout the various views and various embodiments, which are illustrated and described. The figures are not necessarily drawn to scale, and in some instances the drawings have been exaggerated and/or simplified in places for illustrative purposes only. In the following description, the terms "upper," "upward," "up-hole," "lower," "downward," "below," "down-hole" and the like, as used herein, shall mean: in relation to the bottom or furthest extent of the surrounding wellbore even though the well or portions of it may be deviated or horizontal. Where components of relatively well-known designs are employed, their structure and operation will not be described in detail. One of ordinary skill in the art will appreciate the many possible applications and variations of the present invention based on the following description.

The exemplary methods, apparatuses and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed apparatuses, methods and compositions may directly or indirectly affect one or more components or pieces of equipment associated with an exemplary fracturing system 10, according to one or more embodiments. In certain instances, system 10 includes a fracturing fluid producing apparatus 20, a fluid source 30, a proppant source 40, and a pump and blender system 50 and resides at the surface at a well site where a well 60 is located. In certain instances, fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of well 60 or a concentrate to which additional fluid is added prior to use in a fracture stimulation of well 60. In other instances, fracturing fluid producing apparatus 20 can be omitted and the fracturing fluid sourced directly from fluid source 30. In certain instances, the fracturing fluid may comprise water, a hydrocarbon fluid, a polymer gel, foam, air, wet gases and/or other fluids.

Figure 1:
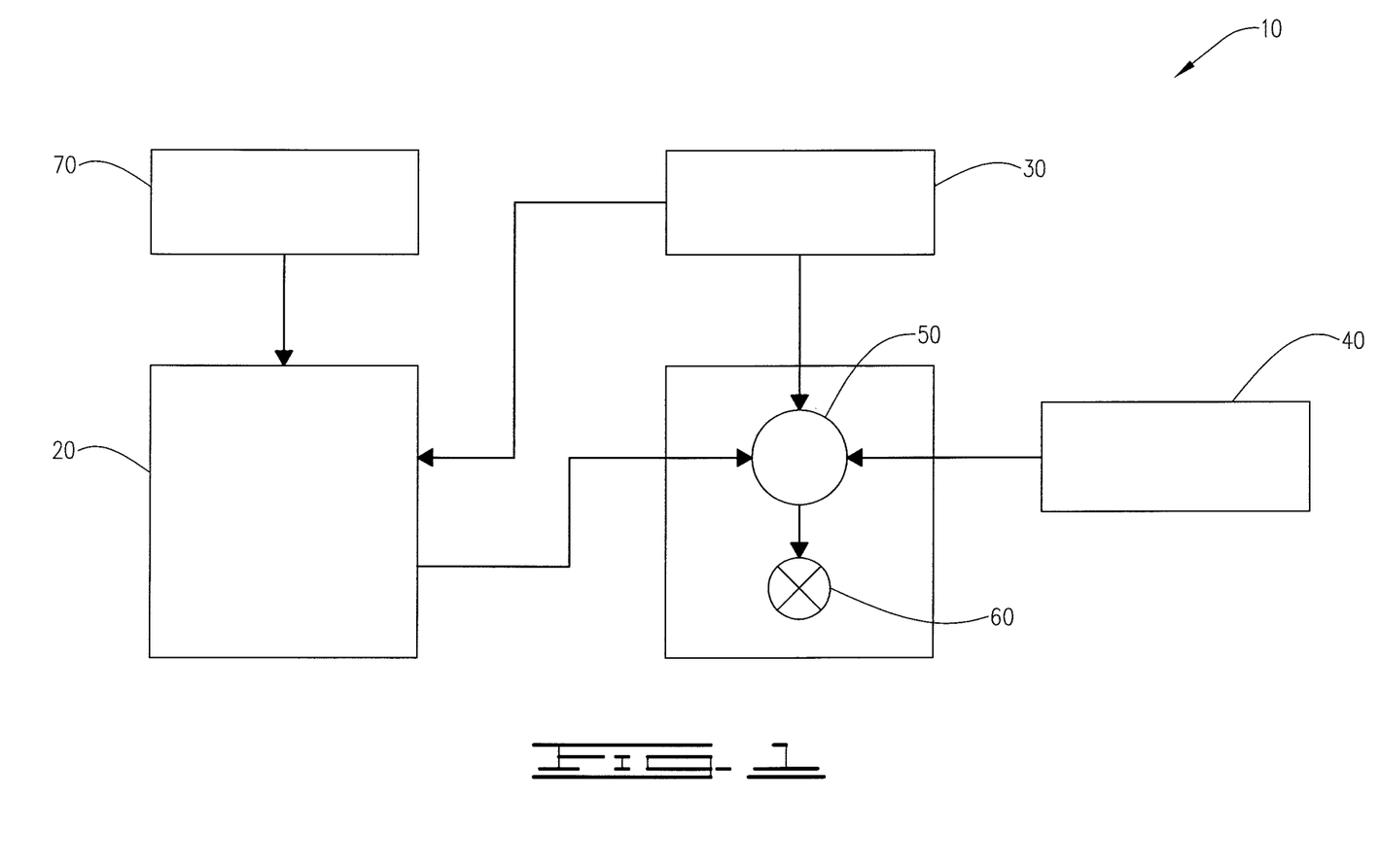
FIG. 1 is a diagram illustrating an example of a fracturing system that may be used in accordance with certain embodiments of the present disclosure.

Proppant source 40 can include a proppant for combination with the fracturing fluid. The system may also include an additive source 70 that provides one or more additives (e.g., gelling agents, weighting agents, and/or other optional additives) to alter the properties of the fracturing fluid. For example, the other additives can be included to reduce pumping friction, to reduce or eliminate the fluid's reaction to the geological formation in which the well is formed, to operate as surfactants, and/or to serve other functions.

Pump and blender system 50 receives the fracturing fluid and combines it with other components, including proppant from proppant source 40 and/or additional fluid from the additives. The resulting mixture may be pumped down well 60 under a pressure sufficient to create or enhance one or more fractures in a subterranean zone, for example, to stimulate production of fluids from the zone. Notably, in certain instances, fracturing fluid producing apparatus 20, fluid source 30, and/or proppant source 40 may be equipped with a conveyor system (see FIGS. 3-7) or multiple conveyor systems in series (see FIG. 8) and one or more metering devices (see FIG. 7) to control the flow of fluids, proppants, and/or other compositions to pumping and blender system 50. Such metering devices may permit pumping and blender system 50 to receive from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times and at other times combinations of fracturing fluid and proppant.

Figure 2:
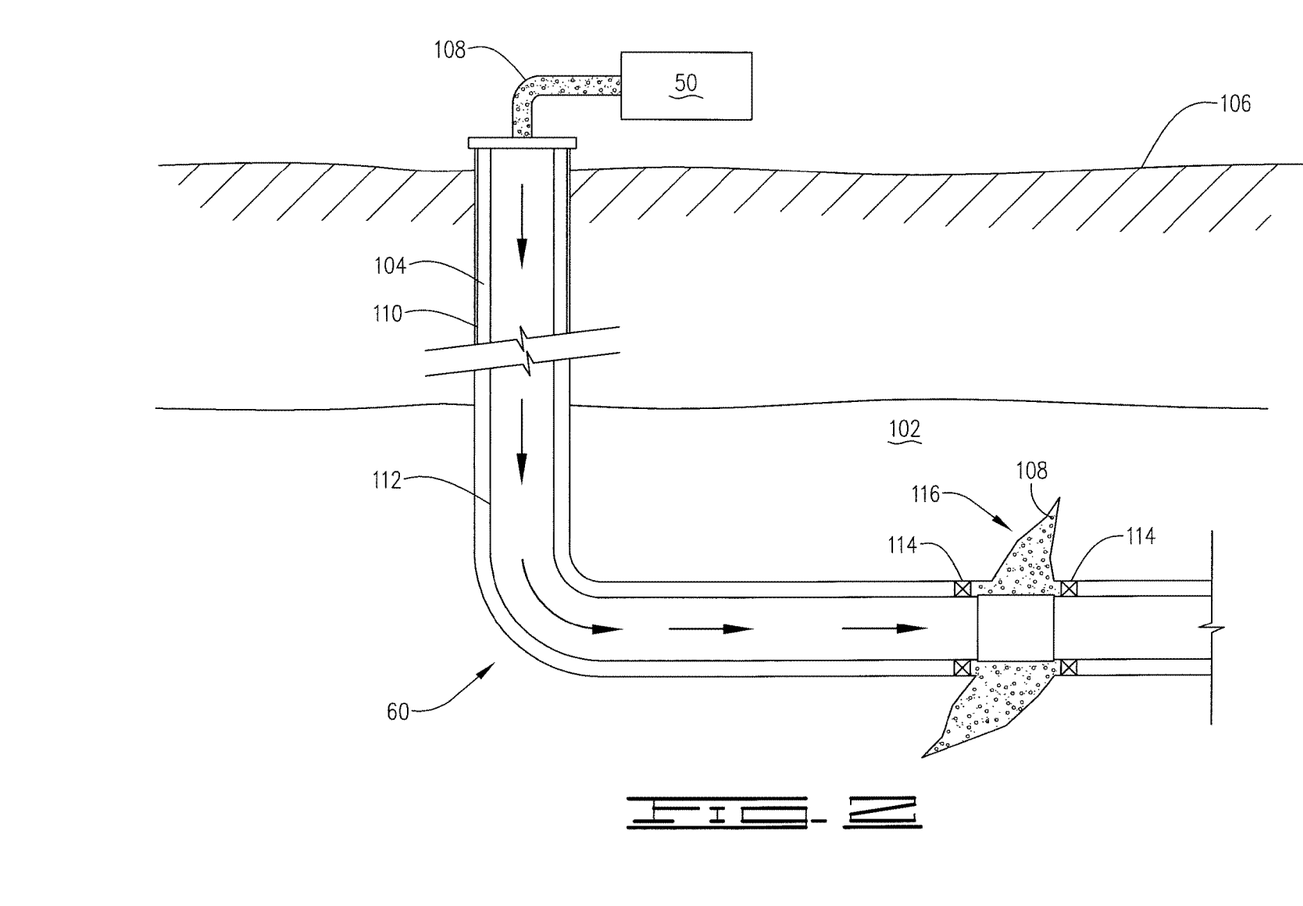
FIG. 2 is a diagram illustrating an example of a subterranean formation in which a fracturing operation may be performed in accordance with certain embodiments of the present disclosure.

FIG. 2 shows well 60 during a fracturing operation in a portion of a subterranean formation of interest 102 surrounding a well bore 104. Well bore 104 extends from the surface 106, and a fracturing fluid 108 is applied to a portion of subterranean formation 102 surrounding the horizontal portion of the well bore. Although shown as vertical deviating to horizontal, well bore 104 may include horizontal, vertical, slanted, curved, and other types of well bore geometries and orientations, and the fracturing treatment may be applied to a subterranean zone surrounding any portion of the well bore. Well bore 104 can include a casing 110 that is cemented or otherwise secured to the well bore wall. Well bore 104 can be uncased or include uncased sections. Perforations can be formed in casing 110 to allow fracturing fluids and/or other materials to flow into subterranean formation 102. In cased wells, perforations can be formed using shaped charges, a perforating gun, hydro jetting and/or other tools.

The well is shown with a work string 112 descending from surface 106 into well bore 104. Pump and blender system 50 is coupled with a work string 112 to pump fracturing fluid 108 into well bore 104. Working string 112 may include coiled tubing, jointed pipe, and/or other structures that allow fluid to flow into well bore 104. Working string 112 can include flow control devices, bypass valves, ports, and or other tools or well devices that control a flow of fluid from the interior of working string 112 into subterranean zone 102. For example, working string 112 may include ports adjacent the well bore wall to communicate fracturing fluid 108 directly into subterranean formation 102, and/or working string 112 may include ports that are spaced apart from the well bore wall to communicate fracturing fluid 108 into an annulus in the well bore between working string 112 and the well bore wall.

Working string 112 and/or well bore 104 may include one or more sets of packers 114 that seal the annulus between working string 112 and well bore 104 to define an interval of well bore 104 into which fracturing fluid 108 will be pumped. For example purposes only, FIG. 2 shows two packers 114, one defining an up-hole boundary of the interval and one defining the down-hole end of the interval. It should be understood that other embodiments may use a greater or lesser number of packers. When fracturing fluid 108 is introduced into well bore 104 (e.g., in FIG. 2, the area of well bore 104 between packers 114) at a sufficient hydraulic pressure, one or more fractures 116 may be created in subterranean zone 102. The proppant particulates in fracturing fluid 108 may enter fractures 116 where they may remain after the fracturing fluid flows out of the well bore. These proppant particulates may "prop" fractures 116 such that fluids may flow more freely through fractures 116.

The apparatuses and methods of this disclosure relate to a conveyor system that transfers a material from a first end to a second end of the conveyor system and may mechanically re-circulate a portion of the material from the second end to the first end of the conveyor system in order to prevent buildup in the conveyor system. The herein disclosed conveyor system provides the means of moving large amounts of material with little or no spillage and also providing a steady, even flow of material to a desired location.

Figure 3:
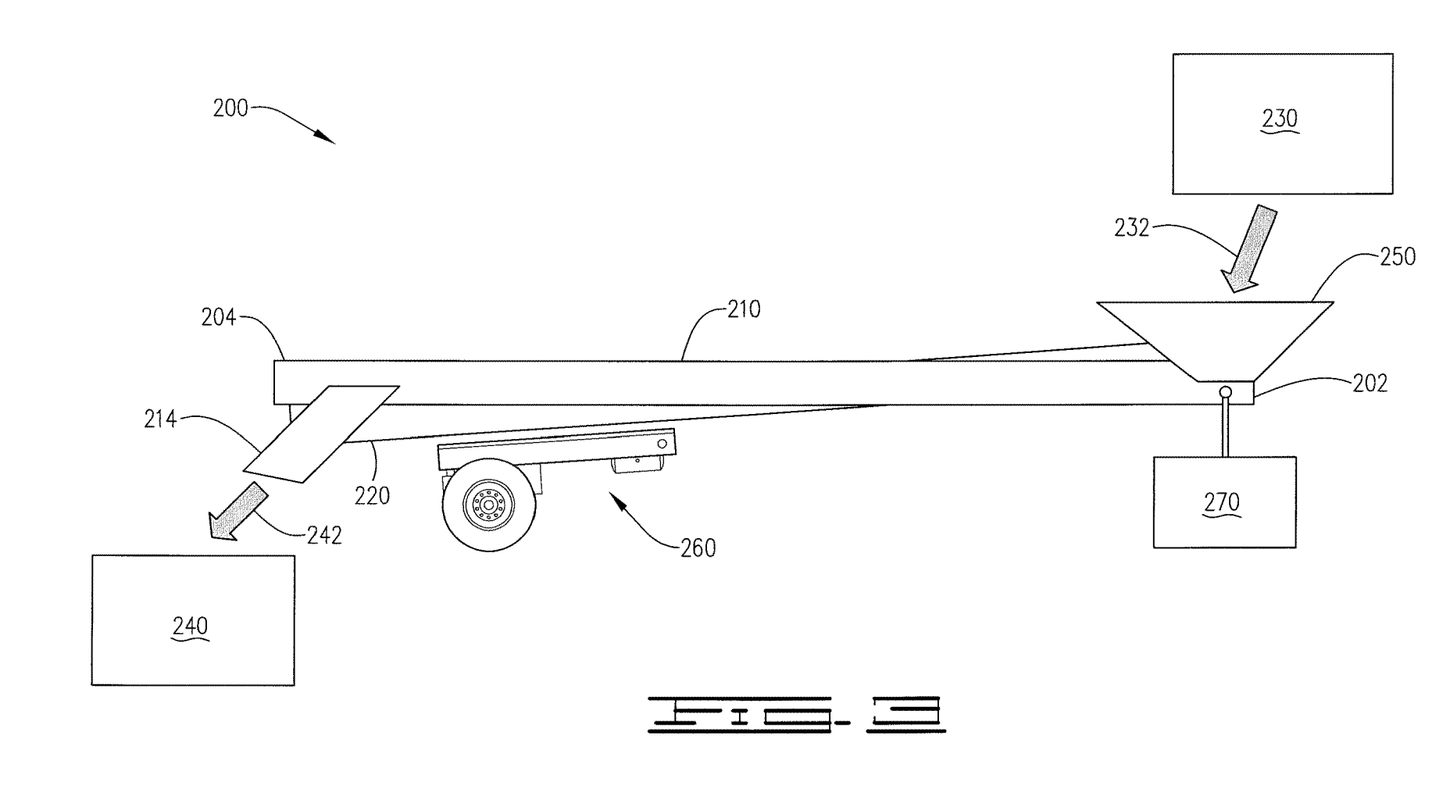
FIG. 3 is a schematic illustration of a side view of a conveyor system that may be used in accordance with certain embodiments of the present disclosure.
Figure 4:
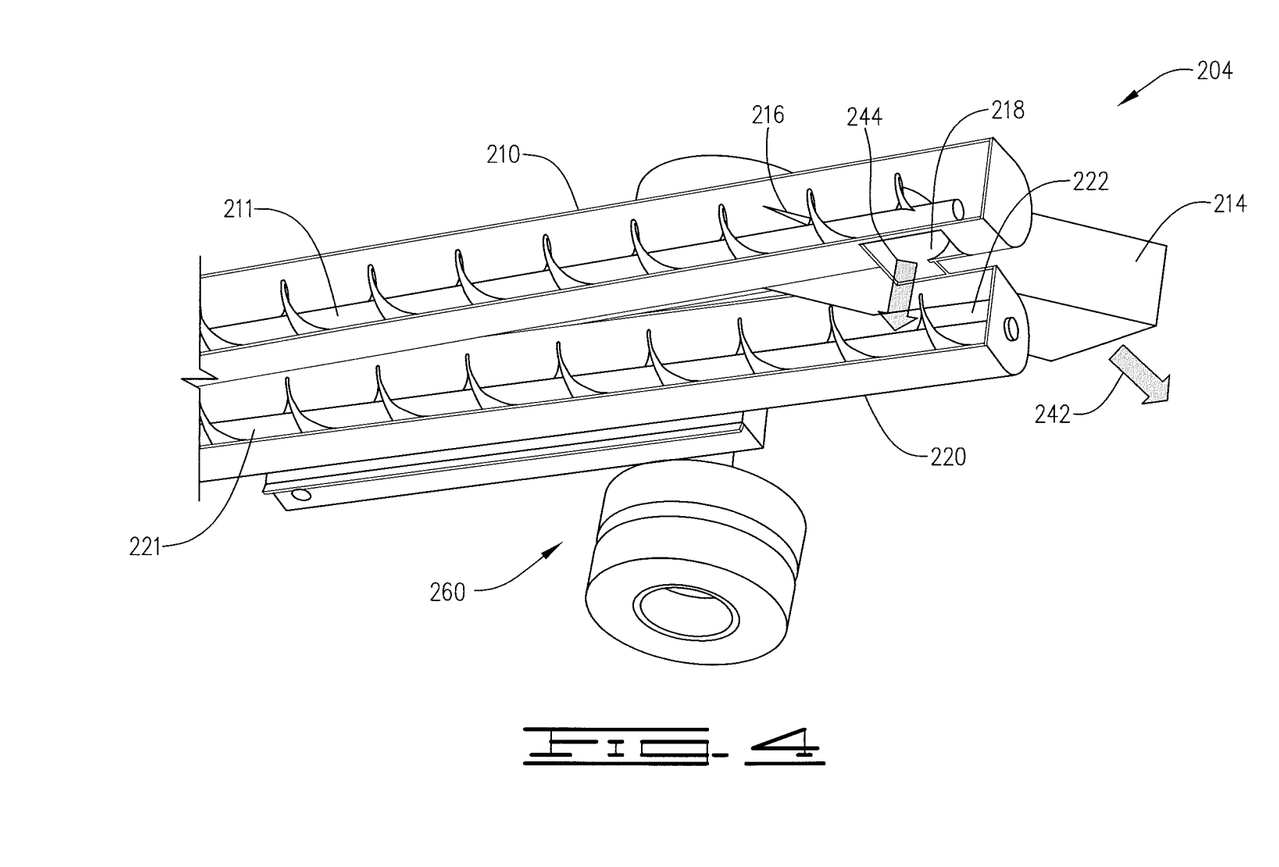
FIG. 4 is a schematic illustration of the second end of a conveyor system that may be used in accordance with certain embodiments of the present disclosure.
Figure 5:
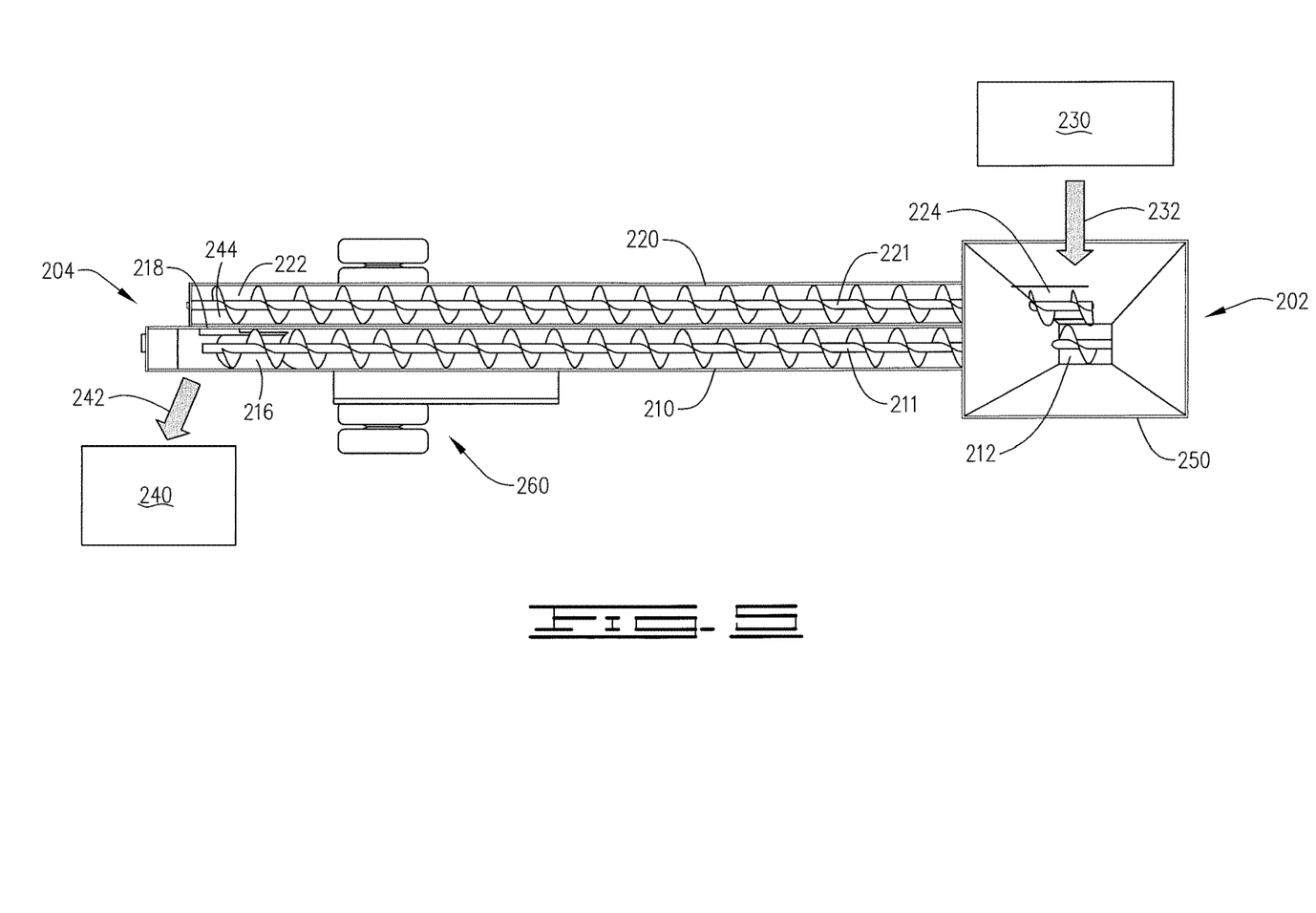
FIG. 5 is a schematic illustration of a top view of a conveyor system that may be used in accordance with certain embodiments of the present disclosure.

As depicted in FIGS. 3-5, conveyor system 200 typically has a least a supply conveyor 210 for transferring the material from a first end 202 to a second end 204 and a return conveyor 220 to re-circulate at least a portion of the material from a second end 204 to a first end 202.

As further depicted in FIGS. 3-5, supply conveyor 210 has an inlet 212 at first end 202 of the conveyor system to receive material 232 from a first source 230, and an outlet 214 at second end 204 of the conveyor system to release a portion of the material (released material 242) to a second source 240.

Supply conveyor 210 has a first carrier system for transferring material from first end 202 to second end 204 of conveyor system 200. First carrier system may be a screw system, drag chain system, a belt system, a pneumatic system, or some other system capable of transferring material 232 from first end 202 to second end 204 of conveyor system 200. As shown in FIGS. 3-5, the first carrier system is a supply screw 211 for the transfer of the material 232. The return conveyor 220 has an inlet 222 at second end 204 of the conveyor system to receive an unreleased material 244, and an outlet 224 at first end 202 of the conveyor system to re-circulate the unreleased material 244 to supply conveyor inlet 212. The return conveyor has a second carrier system for transferring unreleased material 244 from second end 204 to first end 202 of conveyor system 200. Second carrier system may be a screw system, drag chain system, a belt system, a pneumatic system, or some other system capable of transferring unreleased material 244 from second end 204 to first end 202 of conveyor system 200. As shown in FIGS. 3-5 second carrier system is a return screw 221 for the transfer of unreleased material 244.

Material 232 may be a proppant made of virtually any generally solid particle that has sufficient particle strength, sphericity and size. Examples of proppants include silica-containing material, like sand, and ceramic materials have proved to be especially suitable for use in hydraulic fracturing.

In any embodiment herein disclosed, first source 230 consists of a proppant source such as a silo or some other storage unit, and second source 240 covers a companion conveyor system (see FIG. 8), a metering device, a hopper, a pump and blender system 50 (see FIGS. 1-2) or some combination.

A drive motor system 270, comprising at least one drive motor, may be configured to engage the first carrier system and the second carrier system. As depicted in FIG. 3, drive motor system 270 is configured to rotate at least one of supply screw 211 and return screw 221. Drive motor system 270 may be configured in such a way to rotate supply screw 211 to transfer material 232 from first end 202 to second end 204 of the conveyor and to rotate return screw 221 to re-circulate a portion of the material from second end 204 to first end 202 of the conveyor system. As shown, drive motor system 270 is located at first end 202 of the conveyor system. In the alternative, drive motor system 270 may be located elsewhere, such as at second end 204, or as an independent system apart from conveyor system 200. A drive motor suitable to rotate either supply screw 211 or return screw 221 may include any suitable hydraulic motor, electric motor or direct drive system. One suitable drive motor is the Dowmax 600B hydraulic motor marketed by Eaton Hydraulics.

Generally, screw conveyors are available in many configurations and are designed based on industry needs. The diameter of supply screw 211 may depend on the capacity of supply conveyor 210 and the amount of material to be conveyed. Supply screw 211 conveys material 232 at a volumetric rate from first end 202 to second end 204. Similarly, the diameter of return screw 221 may depend on the capacity of return conveyor 220 and the amount of material re-circulated. Return screw 221 conveys unreleased material 232 at a volumetric rate from second end 202 to first end 204. For example, supply screw 211 and return screw 221 may have a diameter of 18 inches and configured with drive motor system 270 capable of rotating at a first rate sufficient to transfer material at 200 cubic feet per minute (CFM).

As further shown in FIG. 3, first end 202 of the conveyor system may mount to a collection hopper 250 wherein supply screw 211 accepts gravity fed material 232 from first source 230. At second end 204 of the conveyor system, supply conveyor 210 directs material (released material 242) to second source 240. Supply screw 211 runs at a preset rate to maintain a volumetric flow of material to second source 240. If second source 240 accepts released material 242 at a volumetric flow rate less than supplied by the supply conveyor 210, buildup of unreleased material 244 occurs (see FIG. 4). The unreleased material 244 gravity feeds into return conveyor 220 materially connected to the supply conveyor 210 at second end 204 of conveyor system 200. Return conveyor 220 re-circulates unreleased material 244 back to collection hopper 250 at first end 202. This arrangement requires no human interaction, electronic or hydraulic control systems to maintain a consistent volumetric flow of material to the metering device.

As shown in FIG. 4, outlet 214 of the supply conveyor may also comprise a first outlet 216 and a second outlet 218. As supply screw 211 of supply conveyor 210 transfers material 232 from first end 202 to second end 204 of conveyor 200, first outlet 216 may release released portion of material (released material 242) to second source 240. If the volumetric flow rate of the material transferred from first end 202 to second end 204 is greater than the volumetric flow rate of released material 242 at first outlet 216 then a buildup of unreleased material 244 occurs. Supply screw 211 continues to run at a preset rate until eventually the buildup of unreleased material 244 gravity feeds from second outlet 218 of the supply conveyor 210 to inlet 222 of the return conveyor 220. Return screw 221 then re-circulates unreleased material 244 to inlet 212 of supply conveyor 210 at first end 202. Inlet 212 of supply conveyor 210 and outlet 224 of return conveyor 220 may be in material communication through collection hopper 250, which can facilitate the distribution and collection of material received (see FIG. 3).

Additionally, supply conveyor 210 and return conveyor 220 are in material flow communication allowing for the recirculation of unreleased material 244 to prevent buildup. Inlet 222 of return conveyor 220 can accept at least a portion of unreleased material 244 from outlet 214 of supply conveyor 210. Inlet 212 of supply conveyor 210 can re-circulate at least a portion of unreleased material 244 from outlet 224 of return conveyor 220. In certain embodiments, inlet 222 of return conveyor 220 may accept material from second source 240 instead of directly from outlet 218 of supply conveyor.

In another embodiment, first source 230 may release material 232 to collection hopper 250. Collection hopper 250, having material flow communication with at least inlet 212 of the supply conveyor 210, facilitates the distribution and transportation of material 232 to inlet 212 of the supply conveyor 210. Supply conveyor 210 then transfers the material to second end 204 of conveyor system 200. Outlet 214 of supply conveyor 210 releases a portion (released material 242) to a metering device 310 (see FIG. 7). Metering device 310 delivers released material 242 to a blender of a pump and blender system 50 (see FIGS. 1-2). The blender mixes the released material 242 with a fracturing fluid to produce a fracturing mixture. The fracturing mixture is introduced into well 60 for use in a fracturing operations using one or more pumps from the pump and blender system 50 (see FIGS. 1-2).

FIG. 5 depicts supply conveyor 210 and return conveyor 220 isolated and separately housed from one another. As shown, material flow communication occurs only between supply conveyor 210 and return conveyor 220 at first end 202 and second end 204 of conveyor system 200. Thus, inlet 212 of supply conveyor 210 at first end 202 of conveyor system 200 receives material 232 from first source 230. Supply screw 211 transfers at least a portion of the material to second end 204 of conveyor system 200. At second end 204, first outlet 216 releases a released portion of material (released material 242) to second source 240. Material not released (unreleased material 244) is transferred by supply screw 211 to second outlet 218 of supply conveyor 210. Unreleased material 244 is gravity fed to inlet 222 of return conveyor at second end 204. Return screw 221 re-circulates unreleased material 244 to inlet 212 of supply conveyor 210 at first end 202.

In another embodiment, conveyor system 200 may be transportable by any means known to one of ordinary skill in the art. As shown in FIGS. 3-5, the conveyor system 200 secures to a transportation device 260 comprising a wheelbase having a platform for affixing a plurality of wheels to said wheelbase.

FIG. 6 depicts the orientation of supply conveyor 210 and return conveyor 220 in relation to the conveyor system 200. Supply conveyor 210 is depicted having a first direction vector 270 and a corresponding first angle γ measured from a first horizontal plane 272. Return conveyor 220 is shown having a second directional vector 280 and a second angle β measured from a second horizontal plane 282. First horizontal plane 272 and second horizontal plane 282 are parallel to one another. First angle γ and second angle β may be equal to one another. Alternatively, at the second end 204 of the conveyor system 200, first angle γ may be greater than second angle at β. First angle γ may be between 0 degrees and about 45 degrees measured from the first horizontal plane 272. Second angle β may be between 0 degrees and 45 degrees measured from the second horizontal plane 282. Typically, first angle γ and second angle β are from 0 to 20 degrees with first angle γ being at least 1 degree greater than second angle α. More typically, first angle γ and second angle β are from 5 to 15 degrees, with first angle γ being at least 5 degrees greater than second angle β. Thus, the relative angle between directional vector 280 and directional vector 270 is generally greater than 1 degree and can be greater than 2 degrees or 5 degrees. Typically, the relative angle will be less than about 15 degrees, and more typically less than about 10 degrees or less than 7 degrees.

The embodiment disclosed shows second angle less than first angle γ. This configuration allows gravity to facilitate the releasing of unreleased material 244 from supply conveyor 210 to return conveyor 220 at second end 204 of conveyor system 200. In a similar manner, gravity facilitates recirculation of unreleased material 244 from return conveyor 220 to supply conveyor 210 at first end 202 of conveyor system 200.

Conveyor system 200 may have an angular position α fixed relative to ground 292. Alternatively, angular position α may be adjustable. Angular position α of conveyor system 200 is measured from ground 292 to a third directional vector 290. Third directional vector bisects first directional vector 270 and second directional vector 280. Adjusting angular position α can be accomplished with at least one or more hydraulic cylinders controlling the adjustment of the conveyor's angular position α. When the hydraulic cylinders are retracted, the conveyor's angular position is less than the angular position when the hydraulic cylinders are extended. A hydraulic power pack, or some other power supply for hydraulic units, supplies the required hydraulic pressure to the hydraulic cylinders. Angular position α of conveyor system may range between 5 degrees and 25 degrees. More preferably, angular position α ranges between 10 degrees and 20 degrees or angular position α is 15 degrees.

Figure 7:
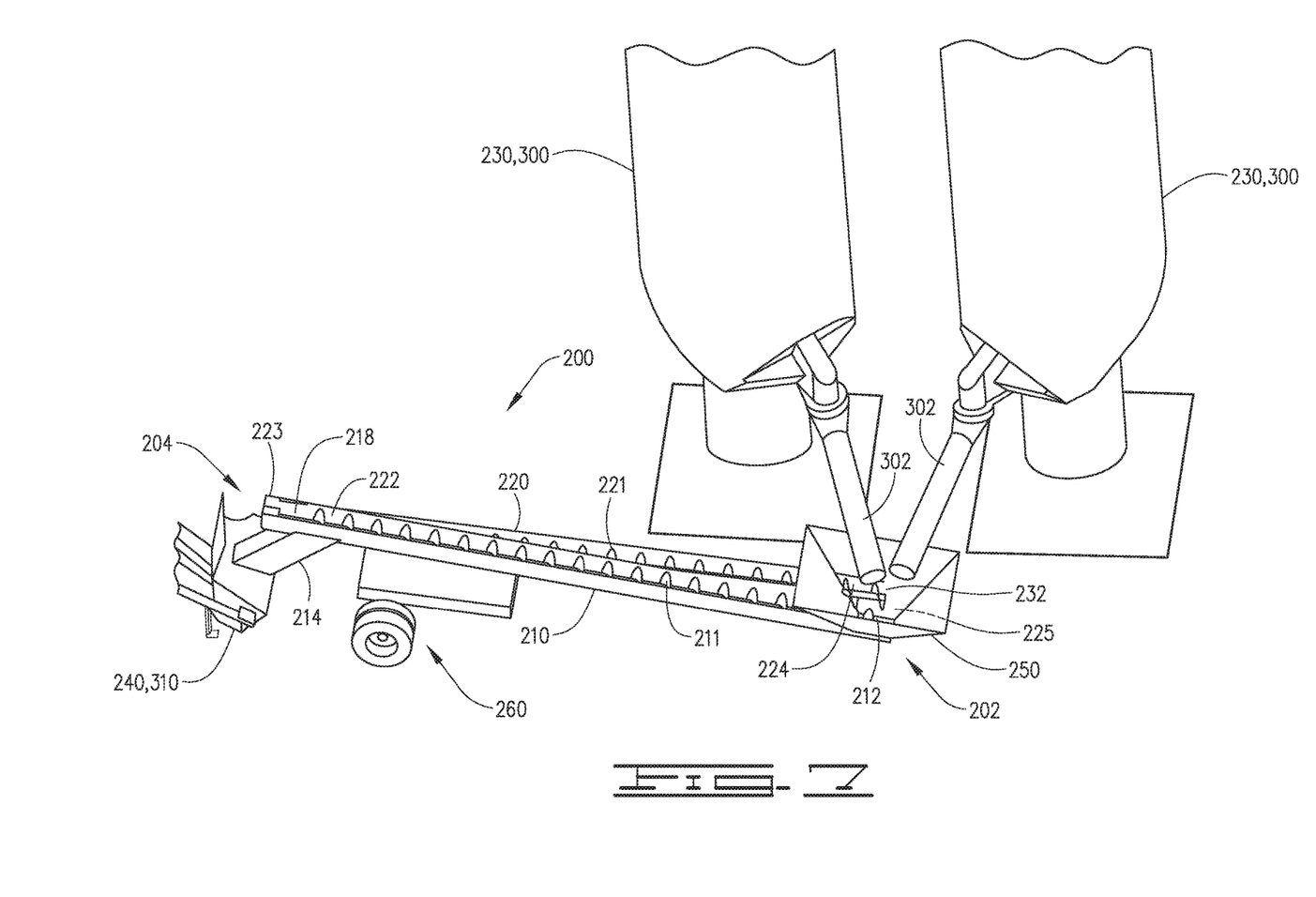
FIG. 7 is a schematic illustration depicting an orientation of a conveyor system that may be used in accordance with certain embodiments of the present disclosure, including an orientation of a supply conveyor in relation to silos.
Figure 8:
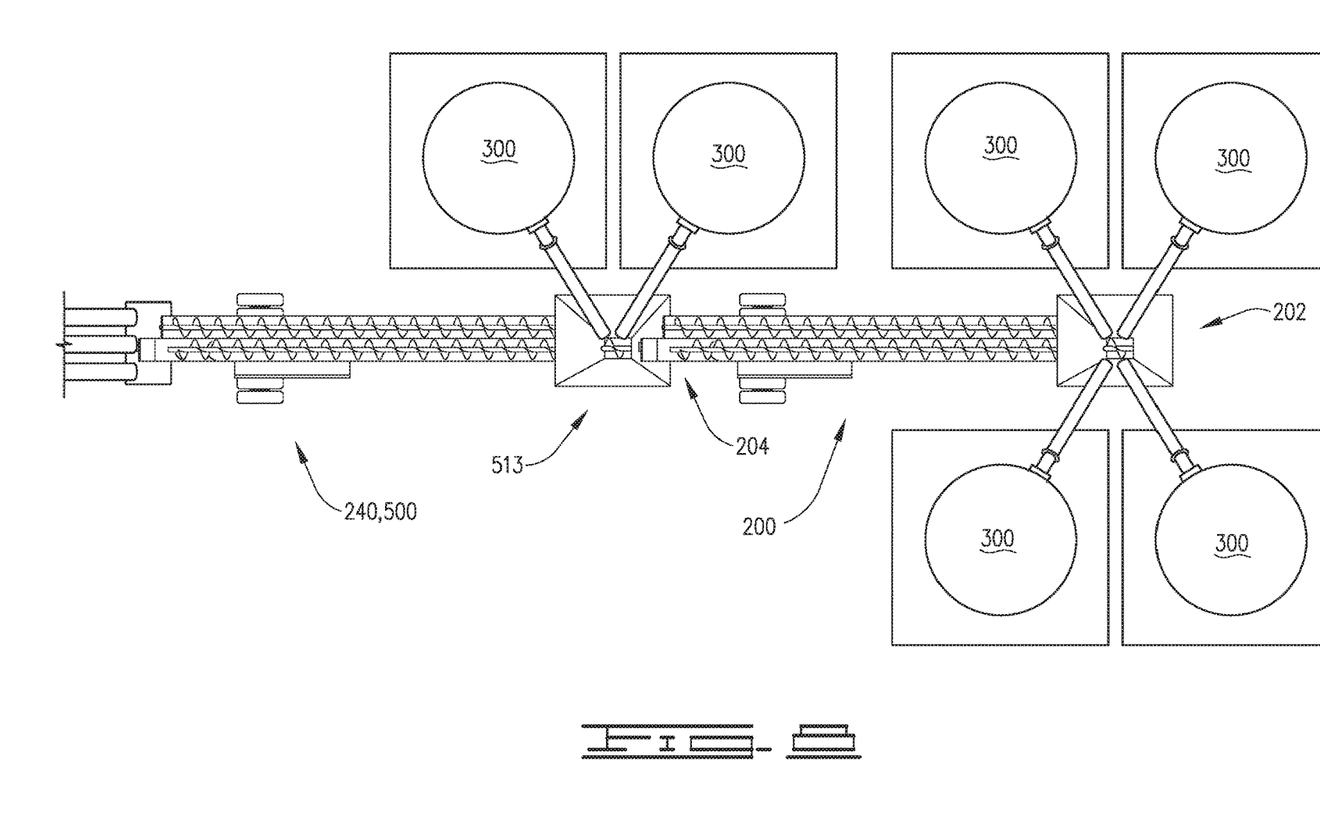
FIG. 8 is a schematic illustration depicting multiple conveyor systems in series, including an orientation of conveyor systems in relation to multiple silos.
Figure 11:
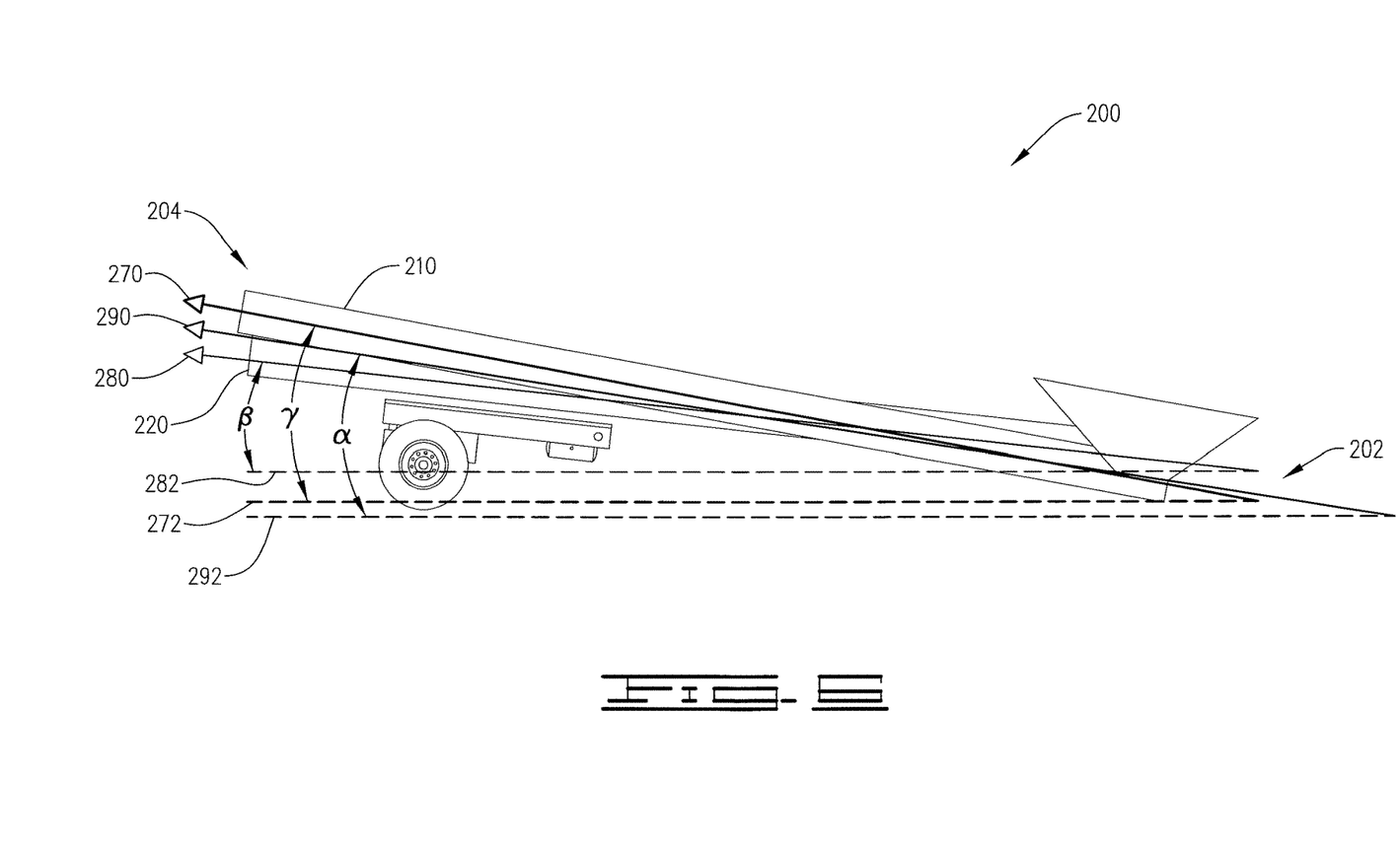

Another embodiment covers a method directed to the transfer of material 232 and recirculation of unreleased material 244. As shown in FIG. 7, first source 230 stores material 232. First source 230 may be silo 300 or some other storage unit. Silos 300 gravity feed material 232 through outlet conduits 302 to conveyor system 200, as described above. Conveyor system 200 may operate at an inclined angular position α (see FIG. 6) such that material 232 can be gravity fed from first source 230 to first end 202 of supply conveyor 210. An operable angular α position depends on the height of outlet conduit 302 of silo 300. The height is such that material communication occurs between first end 202 of supply conveyor 210 and collection hopper 250. Such configuration allows silos 300 to gravity feed material 232 to collection hopper 250. In FIG. 7, first source 230 comprises two silos 300 each having an outlet conduit 302 to direct material. FIG. 8 shows more than two silos 300.

As further depicted in FIG. 7, collection hopper 250 facilitates distribution of material 232 to first end 202 of supply conveyor 210. Inlet 212 of supply conveyor accepts material 232 from collection hopper 250. Supply conveyor 210 has a first carrier system for transferring material 232 from the first end 202 to the second end 204 of supply conveyor 210. The first carrier system may be a screw system, drag chain system, a belt system, a pneumatic system, or some other system capable of transferring material 232 from the first end 202 to the second end 204 of supply conveyor 210. As shown in FIG. 7 the first carrier system is a supply screw 211 that rotates at a present speed to elevate material 232 to second end 204 of supply conveyor 210 at a first rate. The first rate should be a volumetric rate sufficient to transfer material 232 from first end 202 to second end 204 of supply conveyor 211. For example, the first rate may be 200 cubic feet per minute (CFM).

Second end 204 of supply conveyor 210 releases a released portion 242 of the material to second source 240 through outlet 214 at a second rate. In some instances, the first rate and the second rate may be equal. In other instances, buildup of unreleased material 244 may occur at second end 204 of supply conveyor 210 when second rate of material released (released material 242) to second source 240 is less than first rate of material 232 transferred from first end 202 to second end 204 of supply conveyor 210.

Second source 240 may be a companion conveyor system (see FIG. 8), metering device, a hopper (not shown), a pump and blender system 50 (see FIGS. 1-2) or some combination. As shown in FIG. 7, the second source is a metering device 310 accepting released portion 242 of the material at second rate. From metering device 310, released material enters a blender of pump and blender system 50 (see FIGS. 1-2).

Another FIG. 7 depicts that at second end 204 of supply conveyor (first end 223 of return conveyor 220), supply conveyor 210 and return conveyor 220 are in material flow communication such that inlet 222 of return conveyor 220 can accept the buildup of unreleased material 244 from second outlet 218 of supply conveyor 210. Return conveyor 210 has a second carrier system for transferring unreleased material 244 from the first end 223 to the second end 225 of return conveyor 220. The second carrier system may be a screw system, drag chain system, a belt system, a pneumatic system, or some other system capable of transferring unreleased material 244 from the first end 223 to the second end 225 of return conveyor 220. As shown in FIG. 7 the second carrier system is a return screw 221 that conveys unreleased material 244 to a second end 225 of return conveyor 220. At second end 225 of the return conveyor 220 (first end 202 of supply conveyor 210), return conveyor 220 and supply conveyor 210 are in material flow communication such that inlet 212 of supply conveyor 210 can accept unreleased material 244 from outlet 224 of return conveyor 220.

In FIG. 7, collection hopper 250 facilitates the distribution of unreleased material 244 to inlet 212 of the supply conveyor 210. In addition to receiving unreleased material 244, collection hopper 250 may simultaneously receive additional material 232 from silos 300. Supply screw 211 elevates the combination of unreleased material 244 and additional material 232 to second end 204 of supply conveyor 210. At second end 204, a portion of such material is either directed to metering device 310 or to inlet 222 of return screw 220. The portion directed to metering device 310 is then delivered to a blender of pump and blender system 50 (see FIGS. 1-2). The portion directed to inlet 222 of return conveyor 220 is redistributed to inlet 212 of the supply screw 210.

In another embodiment material 232 may be a proppant and second source 240 may be a blender from a pump and blender system 50 (see FIGS. 1-2). The blender mixes the proppant with a fracturing fluid to produce a fracturing mixture. The fracturing mixture is introduced into a well for use in fracturing operations using one or more pumps from the pump and blender system.

FIG. 8 depicts second source 240 as a companion conveyor system 500. This configuration increases the amount of material stored and transported. Silos 300 may directly gravity feed material to first end 202 of conveyor system 200. Silos 300 may also directly gravity feed material to a first end 513 of companion conveyor system 500. Material flow communication occurs between first end 513 of companion conveyor system 500 and second end 204 of conveyor system 200. Multiple companion conveyor systems may be aligned in series. As shown in FIG. 8, six silos 300 are depicted releasing material 232 to the conveyor systems. In this configuration, up to eight silos 300 may gravity feed material to conveyor systems for use in fracturing operations.

The present disclosure also covers the following embodiments of the present disclosure. All the embodiments include a conveyor system having a first end and second end. The conveyor system has a supply conveyor and a return conveyor. The supply conveyor has an inlet at the first end of the conveyor system, an outlet at the second end of the conveyor system and a first carrier system. The return conveyor has an inlet at the second end of the conveyor system and an outlet at the first end of the conveyor system and a second carrier system. The supply conveyor and the return conveyor are in material flow communication such that at the first end, the inlet of the supply conveyor can accept at least a portion of a material from the outlet of the return conveyor. At the second end, the inlet of the return conveyor can accept at least a portion of the material from the outlet of the supply conveyor.

In one embodiment, a storage unit releases the material to a collection hopper at the first end of the conveyor system. The collection hopper distributes at least a portion of the material to the inlet of the supply conveyor. On the second end, the outlet of the supply conveyor releases a second portion of material to a metering device. The metering device releases a third portion of material to a pump and blender system.

In another embodiment, the first carrier system may be a supply screw and the second carrier system may be a return screw.

In the above embodiments, the supply conveyor and return conveyor can be isolated from each other so that material flow communication occurs only between the supply conveyor and return conveyor at the first end and second end of the conveyor system.

Additionally, in the above embodiments, the conveyor system can be transportable.

Also, in the above embodiments the conveyor system has an adjustable angular position.

In one or more of the above embodiments, the supply conveyor can have a first directional vector with a corresponding first angle. The return conveyor can have a second directional vector with a corresponding second angle. The supply conveyor and return conveyor are configured such that at the first end of the conveyor system the second angle is less than or equal to the first angle.

In other embodiments, the above conveyor systems have at least one drive motor configured to rotate at least one of the supply screw and the return screw. The conveyor system may also have at least one drive motor configured to rotate at least one supply screw and at least one drive motor configured to rotate at least one return screw.

In still other embodiments of the above conveyor systems, the inlet of the supply conveyor accepts the material from a first source and the outlet of the supply conveyor releases a portion of the material to a second source.

In one or more of the above embodiments, the outlet of the supply conveyor can comprise a first outlet and a second outlet such that the first outlet can release at least a portion of the material to the second source, and the inlet of the return conveyor can accept at least a portion of the material from the second outlet. The first source may be a storage unit, and the second source may be a metering device. The inlet of the supply conveyor accepts the material from a collection hopper. The collection hopper receives the material from the storage unit. The outlet of the supply conveyor releases a released portion of material to the metering device and the metering device delivers the released portion of material to a pump and blender system.

Another embodiment covers a method of transferring a material from a first source to a first end of a supply conveyor. The material is conveyed to a second end of the supply conveyor at a first rate. At the second of the supply conveyor, a released portion of the material is released to a second source at a second rate. When the second rate is less than the first rate, buildup occurs of an unreleased material at the second end of the supply conveyor. The unreleased material is introduced to a first end of a return conveyor. The return conveyor conveys the unreleased material to a second end of the return conveyor. At the second end of the return conveyor, the unreleased material is re-circulated to the first end of the supply conveyor.

In some embodiments, the second source is a companion conveyor system having a first end, a second end, a supply conveyor and a return conveyor. The supply conveyor has an inlet at the first end, an outlet at the second end and a first carrier system. The return conveyor has an inlet at the second end and an outlet at the first end and a second carrier system. The supply conveyor and the return conveyor are in material flow communication such that the inlet of the supply conveyor can accept at least a portion of a material from the outlet of the return conveyor and the inlet of the return conveyor can accept at least a portion of the material from the outlet of the supply conveyor.

In another embodiment, a second portion of the material is introduced from the second end of the supply conveyor to the first end of the return conveyor and the second portion is at least part of the unreleased material. In the above embodiments, the material can be transferred from one or more storage units to the first source. The released material can be transferred from the second source to a pump and blender system. In the aforementioned embodiments, the material can be a proppant and a blender of the pump and blender system which mixes the proppant with a fracturing fluid to produce a fracturing mixture. The fracturing mixture can be introduced into a well for use in a fracturing operation. The fracturing mixture can be introduced into the well using one or more pumps.

Therefore, the present disclosure is well adapted to attain the ends and advantages mentioned, as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b")

disclosed herein is to be understood to set forth every number and range encompassed within the broader range of values. Also, the terms in the claims have their plain, ordinary meaning unless otherwise explicitly and clearly defined by the patentee.

What is claimed:

1. An apparatus comprising:
a conveyor system having a first end, a second end, a supply conveyor and a return conveyor;
the supply conveyor has an inlet at the first end of the conveyor system, an outlet at the second end of the conveyor system and a first carrier system, which transfers material from the first end to the second end of the conveyor system; and
the return conveyor has an inlet at the second end of the conveyor system and an outlet at the first end of the conveyor system and a second carrier system, which transfers material from the second end to the first end of the conveyor system; and
wherein the supply conveyor and the return conveyor are in material flow communication such that the inlet of the supply conveyor can accept at least a portion of material from the outlet of the return conveyor and such that the inlet of the return conveyor can accept at least a portion of the material from the outlet of the supply conveyor; and
wherein a storage unit releases the material to a collection hopper and where the collection hopper distributes at least a portion of the material to the inlet of the supply conveyor;
and wherein the outlet of the supply conveyor releases a released portion of material to a metering device; and wherein the metering device delivers the released portion of material to a pump and blender system.

2. The apparatus of claim 1, wherein the supply conveyor and return conveyor are isolated from each other so that material flow communication occurs only between the supply conveyor and return conveyor at the first end and second end of the conveyor system.

3. The apparatus of claim 1, wherein the conveyor system has an adjustable angular position.

4. An apparatus comprising:
a conveyor system having a first end, a second end, a supply conveyor and a return conveyor;
the supply conveyor has an inlet at the first end of the conveyor system, an outlet at the second end of the conveyor system and a first carrier system, which transfers material from the first end to the second end of the conveyor system; and
the return conveyor has an inlet at the second end of the conveyor system and an outlet at the first end of the conveyor system and a second carrier system, which transfers material from the second end to the first end of the conveyor system; and
wherein the supply conveyor and the return conveyor are in material flow communication such that the inlet of the supply conveyor can accept at least a portion of material from the outlet of the return conveyor and such that the inlet of the return conveyor can accept at least a portion of the material from the outlet of the supply conveyor; and
wherein the supply conveyor has a first directional vector with a corresponding first angle and the return conveyor has a second directional vector with a corresponding second angle, wherein the supply conveyor and return conveyor are configured such that at the first end of the conveyor system the second angle is less than or equal to the first angle.

5. The apparatus of claim 4, wherein the first carrier system is a supply screw and the second carrier system is a return screw.

6. The apparatus of claim 4, wherein the inlet of the supply conveyor accepts a first portion of the material from a first source and wherein the outlet of the supply conveyor releases a second portion of the material to a second source.

7. The apparatus of claim 6, wherein the supply conveyor comprises a first outlet and a second outlet such that the first outlet can release at least a portion of the material to the second source, and the inlet of the return conveyor can accept at least a portion of the material from the second outlet.

8. The apparatus of claim 7, wherein the first source is a storage unit, the second source is a metering device, and wherein the inlet of the supply conveyor accepts a material from a collection hopper; and wherein the collection hopper receives the material from the storage unit; and wherein the outlet of the supply conveyor releases a released portion of material to the metering device; and wherein the metering device delivers the released portion of material to a pump and blender system.

9. The apparatus of claim 8, wherein the supply conveyor and return conveyor are isolated from each other so that material flow communication occurs only between the supply conveyor and return conveyor at the first end and second end of the conveyor system.

10. The apparatus of claim 9, wherein the conveyor system has an adjustable angular position.

11. The apparatus of claim 1, wherein the supply conveyor has a first directional vector with a corresponding first angle and the return conveyor has a second directional vector with a corresponding second angle, wherein the supply conveyor and return conveyor are configured such that at the first end of the conveyor system the second angle is less than or equal to the first angle.

12. A method comprising:
transferring a material from a first source to a first end of a supply conveyor;
conveying the material to a second end of the supply conveyor at a first rate;
releasing a released portion of the material to a second source at a second rate wherein, when the second rate is less than the first rate, buildup occurs of an unreleased material at the second end of the supply conveyor;
introducing the unreleased portion to a first end of a return conveyor;
conveying the unreleased portion to a second end of the return conveyor; and
recirculating the unreleased portion to the first end of the supply conveyor;
wherein the second source is a companion conveyor system having a first end, a second end, a supply conveyor and a return conveyor; wherein the supply conveyor has an inlet at the first end, an outlet at the second end and a first carrier system for transferring material from the first end to the second end of the conveyor system; wherein the return conveyor has an inlet at the second end and an outlet at the first end and a second carrier system for transferring material from the second end to the first end of the conveyor system; and wherein the supply conveyor and the return conveyor are in material flow communication such that the inlet of the supply conveyor can accept at least a portion of a material from the outlet of the return conveyor and such that the inlet of the return conveyor can accept at least a portion of the material from the outlet of the supply conveyor.

13. The method of claim 12, wherein a second portion of the material is introduced to the first end of the return conveyor from the second end of the supply conveyor and the second portion is at least part of the unreleased material.

14. The method of claim 12, wherein the supply conveyor and return conveyor are isolated from each other so that material flow communication occurs only between said first end of the supply conveyor and the second end of the return conveyor and between the second end of the supply conveyor and the first end of the return conveyor.

15. The method of claim 12, wherein the supply conveyor has a first directional vector with a corresponding first angle and the return conveyor has a second directional vector with a corresponding second angle, wherein the supply conveyor and return conveyor are configured such that at the first end of the conveyor system the second angle is less than or equal to the first angle.

16. The method of claim 12, further comprising:
transferring the material from one or more storage units to the first source; and
wherein the releasing of the released portion of the material from the second source transfers the material to a pump and blender system.

17. The method of claim 16, wherein the material is a proppant and a blender of the pump and blender system mixes the proppant with a fracturing fluid to produce a fracturing mixture.

18. The method of claim 17, wherein the fracturing mixture is introduced into a well for use in a fracturing operation using one or more pumps.

* * * * *